United States Patent [19]

Kawai et al.

[11] 4,298,983
[45] Nov. 3, 1981

[54] AUTOMATIC EQUALIZATION SYSTEM IN FM COMMUNICATION CIRCUIT

[75] Inventors: Kazuo Kawai, Yokohama; Hidetaka Yanagidaira, Omiya; Michitoshi Tamori, Tokyo, all of Japan

[73] Assignee: Kokusai Denshin Denwa Kabushiki Kaisha, Tokyo, Japan

[21] Appl. No.: 88,521

[22] Filed: Oct. 26, 1979

[30] Foreign Application Priority Data

Oct. 27, 1978 [JP] Japan .................................. 53/131708
Nov. 29, 1978 [JP] Japan .................................. 53/146583

[51] Int. Cl.³ .......................................... H09B 15/00
[52] U.S. Cl. ........................................ 375/12; 375/14
[58] Field of Search ............... 375/12, 14, 15; 455/63, 455/295

[56] References Cited

U.S. PATENT DOCUMENTS

| | | | |
|---|---|---|---|
| 3,434,056 | 3/1969 | Becker | 455/63 |
| 3,670,269 | 6/1972 | Starr et al. | 375/14 |
| 3,763,359 | 10/1973 | Cho et al. | 375/14 |
| 3,921,072 | 11/1975 | Sato | 375/14 |
| 4,125,899 | 11/1978 | Kawai et al. | 375/12 |
| 4,146,838 | 3/1979 | Takada | 455/63 |

*Primary Examiner*—Glen R. Swann, III
*Attorney, Agent, or Firm*—Robert E. Burns; Emmanuel J. Lobato; Bruce L. Adams

[57] ABSTRACT

An automatic amplitude and phase equalization system in an FM communication circuit, in which a pilot signal included in a baseband signal of a transmitted FM signal demodulated by an FM demodulator is extracted and frequency-multiplied, a high harmonic wave of the pilot signal generated in the baseband signal is phase-detected using the frequency-multiplied output as a reference signal, an amplitude equalizer provided before the FM demodulator is driven by a component included in the phase detected output and of the same phase as the reference signal, and a phase equalizer provided before the FM demodulator is driven by a component included in the phase detected output and orthogonal to the reference signal, whereby amplitude and phase characteristics of a transmission path of the FM signal are automatically equalized.

2 Claims, 9 Drawing Figures

AUTOMATIC EQUALIZATION SYSTEM IN FM COMMUNICATION CIRCUIT

FIELD OF THE INVENTION

This invention relates to an automatic phase equalization system for suppressing a phase distortion in an FM communication circuit.

BACKGROUND OF THE INVENTION

In FM communication circuits, there occurs an intermodulation noise due to a linear distortion, such as an amplitude or phase distortion in an electric wave propagation path, a waveguide system or an FM signal amplifying system, resulting in the degraded signal quality; it is known in the art that the most forceful factor of such degradation is the phase distortion. The phase distortion is caused by the presence of an echo in the transmission system, and in the waveguide system and in the amplification system, generation of the echo is steady, so that phase equalization can be achieved by the use of a fixed phase equalizer. However, in a multipath-propagation path, especially in an over the horizon scattering propagation path, an oversea propagation path, a mountainous diffraction propagation path or the like, the phase distortion is often accompanied by fading, so that diversity reception is usually employed to improve the phase distortion; this is very uneconomical.

The "Automatic Phase Equalization System in FM communication circuits" (Japan. Pat. Appln. Ser. No. 57130/78) previously proposed by the present inventors is intended to maintain the overall phase characteristic substantially linearly at all times by detecting a phase distortion from a product component of various pilot signals included in a demodulated base-band signal and automatically controlling a phase equalizer by the detected output. In the invention of this prior application, in the detection of the phase distortion, coefficients of respective degrees in a variable phase equalizer of a power series characteristic provided in the former stage of demodulation of the FM signal, that is, in the intermediate-frequency stage, are slightly changed in amplitude at a low frequency to thereby vary the envelope of the product component, and from the phase of the variation, the polarity of the coefficient of the power series is detected. Accordingly, a control signal therefor cannot be obtained unless the envelope signal, that is, a low-frequency signal is phase detected and smoothed, so that the response speed as an automatic control system depends on the frequency of this low-frequency signal; therefore, it is desirable to select this frequency as high as possible. However, the rise in frequency is limited by the band width of a band-pass filter used for extracting the product component; namely, the response speed of the automatic control system is held low in correspondence to the abovesaid smoothing, resulting in incapability of following up the rapid selective fading.

SUMMARY OF THE INVENTION

In view of the above, an object of the present invention is to provide an automatic phase equalization system in an FM communication circuit which does not employ such a low-frequency signal as in the prior art system for detecting the coefficient of the power series and hence does not require a phase detector and the smoothing and permits effective use of the band of the product component-extracting band-pass filter, thereby enabling the response speed of the automatic control system to sufficiently follow up the selective fading.

Another object of the present invention is to provide an automatic amplitude and phase equalization system in an FM communication circuit which is capable of automatic equalization with respect to both the amplitude distortion and the phase distortion and is able to alleviate selective fading and to enlarge the coherent band width, permitting economical construction of high-quality communication circuits of small intermodulation noise.

BRIEF DESCRIPTION OF THE DRAWINGS

The present invention will hereinafter be described in detail with reference to the accompanying drawings, in which.

DESCRIPTION OF THE PREFERRED EMBODIMENTS

Figure 1:
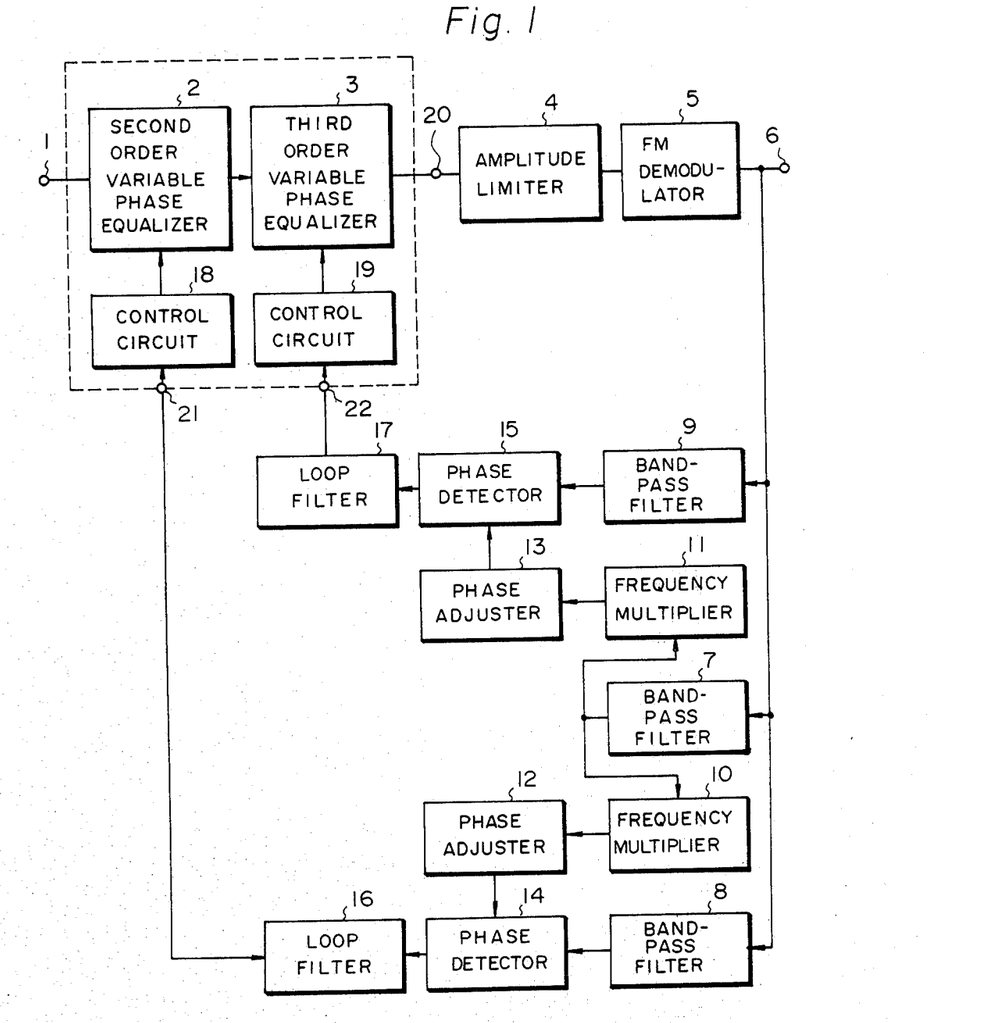
FIG. 1 is a block diagram illustrating an embodiment of this invention.

With reference to FIG. 1, an embodiment of this invention will be described. A received FM signal is applied to an input terminal 1 after being converted into an intermediate-frequency signal. This signal is applied to a second order variable phase equalizer 2 and a third order variable phase equalizer 3 and then amplitude limited by an amplitude limiter 4, thereafter being demodulated by an FM demodulator 5 into a baseband signal, which is obtained at a demodulated output terminal 6. When expressing the phase characteristic of the transmission system in terms of power series, as expressed in the following formula (1):

$$\phi(\omega) = a_0 + a_1\omega + a_2\omega^2 + a_3\omega^3 + a_4\omega^4 + \ldots \qquad (1)$$

the terms of zero and first orders have nothing to do with transmission distortion and hence are negligible, and the terms of fourth and higher orders are also negligible as compared with the amounts of distortion generated from the terms of second and third orders; therefore, the second order variable phase equalizer 2 and the third order phase equalizer 3 are utilized to provide the following phase characteristic:

$$\theta(\omega) = b_2\omega^2 + b_3\omega^3 \qquad (2)$$

When $$b_2 = -a_2, \quad b_3 = -a_3 \tag{3}$$

second and third order distortions are zero.

For convenience of explanation, the arrangements of the second order phase equalizer 2 and the third order phase equalizer 3 will be described later. When the formula (3) does not hold, a linear distortion occurs, and the product component of the baseband signal is yielded. Usually, a frequency division multiplex (hereinafter referred to as FDM) telephone signal includes many pilot signals, and also in cases of non-FDM signals, when they are transmitted over a microwave communication circuit, radio pilot signals are often included in the baseband signal, so that these pilot signals can be utilized to detect the phase distortion.

With respect to a distorted waveform which occurs in the demodulated output when a single sine wave in the modulated signal is phase-distorted, various analyses have already been made; for example, "FM Radio Engineering" (edited by T. Sugawara) describes as follows: Letting an FM wave modulated by a modulating signal $\mu(t)$ be represented by $$S = A \sin(\Omega_0 t + \int^t \mu(t) dt) \tag{4}$$

when the FM wave passes through a transmission line having an amplitude characteristic $G(\Omega)$ and a phase characteristic $\phi(\Omega)$, it becomes as follows:

$$S' = AG(\Omega_0 + \mu(t)) \sin \{\Omega_0 t + \int^t \mu(t) dt + \phi(\Omega_0 + \mu(t))\} \tag{5}$$

and the following demodulated output is resulted:

$$\Omega'(t) = \Omega_0 + \mu(t) + (d/dt)\phi(\Omega_0 + \mu(t)) \tag{6}$$

The third term of the expression (6) is a distortion component $\phi(\Omega_0 + \mu(t))$ represents an instantaneous phase angle of the distortion component, and in respect of $\Omega_0$, it can be expanded into a power series as follows:

$$\phi(\Omega_0 + \mu(t)) = \beta_0 + \beta_1 \mu(t) + \beta_2 \mu^2(t) + \beta_3 \mu^3(t) + \ldots \tag{7}$$

where $$\beta_0 = \phi(\Omega_0) \quad\quad \beta_1 = \left[\frac{d\phi}{d\Omega}\right]\Omega_0$$

$$\beta_2 = \frac{1}{2!}\left[\frac{d^2\phi}{d\Omega^2}\right]\Omega_0, \quad \beta_3 = \frac{1}{3!}\left[\frac{d^3\phi}{d\Omega^3}\right]\Omega_0$$

Therefore, the terms of the second and third orders in the expression (7) respectively correspond to second and third order distortions. Their time differentiations represent the distorted waveform; now if $$\mu(t) = \Delta\Omega \cos P_m t \tag{8}$$

the second order distorted waveform, that is, a second harmonic waveform becomes as follows:

$$(d/dt)(\beta_2 \mu^2(t)) = -\tfrac{1}{2}\beta_2 \Delta\Omega^2 (2P_m) \sin 2P_m t \tag{9}$$

In a case where an equalizer is provided, since $\beta_2$ in the expression (9) corresponds to a value $(a_2 + b_2)$, the amplitude and phase of the waveform of the second harmonic in the demodulated output are determined by the value $(a_2 + b_2)$, that is, the coefficient of the second order with respect to the overall phase characteristics of the transmission line and the phase equalizer. Similarly, the waveform of a third order distorted waveform, that is, a third harmonic waveform becomes as follows:

$$(d/dt)(\beta_3 \mu^3(t)) = -\tfrac{1}{4}\beta_3 \Delta\Omega^3 (3P_m) \sin 3P_m t \tag{10}$$

so that its amplitude and phase are also determined by $\beta_3$, that is a value $(a_3 + b_3)$.

Thus, by frequency-multiplying the fundamental wave of a pilot signal and by phase-detecting the second harmonic using the produced wave, a control signal of the second order phase equalizer is obtained; and by phase-detecting the third harmonic using a wave three times higher in frequency than the fundamental wave, a control signal of the third order phase equalizer is obtained.

In FIG. 1, the fundamental wave of a pilot signal is extracted by a band-pass filter 7 from the demodulated output signal and doubled by a frequency multiplier 10 and then phase-adjusted by a phase adjuster 12 to obtain a reference signal. The reference signal thus obtained is applied to a phase detector 14, in which it is used for phase-detecting a second harmonic extracted by a band-pass filter 8. The detected output controls the second order variable phase equalizer 2 through a loop filter 16 such as an integrator, a low-pass filter or the like, and an equalizer control circuit 18.

On the other hand, the output from the band-pass filter 7 is made three-fold by a frequency multiplier 11 and phase-adjusted by a phase adjuster 13 to obtain a reference signal, and a third harmonic extracted by a band-pass filter 9 is phase detected by a phase detector 15 using the reference wave. The detected output controls the third order variable phase equalizer 3 through a loop filter 17 and an equalizer control circuit 19. As the second and third order variable phase equalizers 2 and 3 and the equalizer control circuits 18 and 19, use can be made of equalizers and control circuits employed in the aforementioned "Automatic Equalization System in FM Communication Circuit" (Japan. Pat. Appln. No. 57130/78). Namely, if the expression (2) is modified as follows:

$$\theta(\omega) = (b_2/\tau^2)(\omega\tau)^2 + (b_2\tau^2)(\omega\tau)^3 \tag{11}$$

it can be expressed by the Fourier expansion as follows:

$$\theta(\omega) = \frac{b_2}{\tau^2}\left[\frac{\pi^2}{3} + 4\sum_{n=1}^{\infty}(-1)^n \frac{\cos n\omega\tau}{n^2}\right] + \frac{b_3}{\tau^3}\left[2\sum_{n=1}^{\infty}(-1)^{n-1}(n^2\pi^2 - 6)\frac{\sin n\omega\tau}{n^3}\right] \tag{12}$$

where $(b_2\pi^2/3\tau^2)$ is a constant and hence can be removed, and the above expression becomes as follows:

$$\theta(\omega) = \sum_{n=1}^{\infty}(-1)^n \frac{4b_2}{\tau^2 n^2} \cos n\omega\tau + \sum_{n=1}^{\infty}(-1)^{n-1} \frac{2b_3(n^2\pi^2 - 6)}{\tau^3 n^3} \sin n\omega\tau \tag{13}$$

Expressed in a general form, this can be as follows:

$$\theta(\omega) = \sum_{n=1}^{\infty} (C_n \cos n\omega\tau + d_n \sin n\omega\tau) \quad (14)$$

Letting a transfer function be represented by $$G(j\omega) = e^{j \sum_{n=1}^{\infty} (C_n \cos n\omega\tau + d_n \sin n\omega\tau)} \quad (15)$$

it is possible to obtain the phase characteristic of the expression (14). This transfer function can be modified as follows:

$$e^{jC_1 \cos \omega\tau} = J_0(C_1) + \sum_{m=1}^{\infty} (-1)^m J_{2m}(C_1) e^{-j2m\omega\tau} \quad (16)$$

$$+ \sum_{m=1}^{\infty} (-1)^m J_{2m}(C_1) e^{j2m\omega\tau} + j \sum_{m=0}^{\infty} (-1)^m$$

$$J_{2m+1}(C_1) e^{-j(2m+1)\omega\tau} + j \sum_{m=0}^{\infty} (-1)^m$$

$$J_{2m+1}(C_1) e^{j(2m+1)\omega\tau}$$

$$e^{jd_1 \sin \omega\tau} = J_0(d_1) + \sum_{m=1}^{\infty} J_{2m}(d_1) e^{-j2m\omega\tau} \quad (17)$$

$$+ \sum_{m=1}^{\infty} J_{2m}(d_1) e^{j2m\omega\tau} - \sum_{m=0}^{\infty} J_{2m+1}(d_1) e^{-j(2m+1)\omega\tau}$$

$$+ \sum_{m=0}^{\infty} J_{2m+1}(d_1) e^{j(2m+1)\omega\tau}$$

This shows that the phase characteristic can be achieved through utilization of transversal filters employing delay elements each having a fundamental delay $\tau$. That is, $J_0(C_1)$ indicates that the tap weight of the center tap is made a Bessel function $J_0(C_1)$, and $j(-1)^m J_{2m+1}(C_1) e^{-j(2m+1)\omega\tau}$ indicates that the $-(2m+1)$th tap weight may be $j(-1)^m J_{2m+1}(C_1)$.

Figure 2:
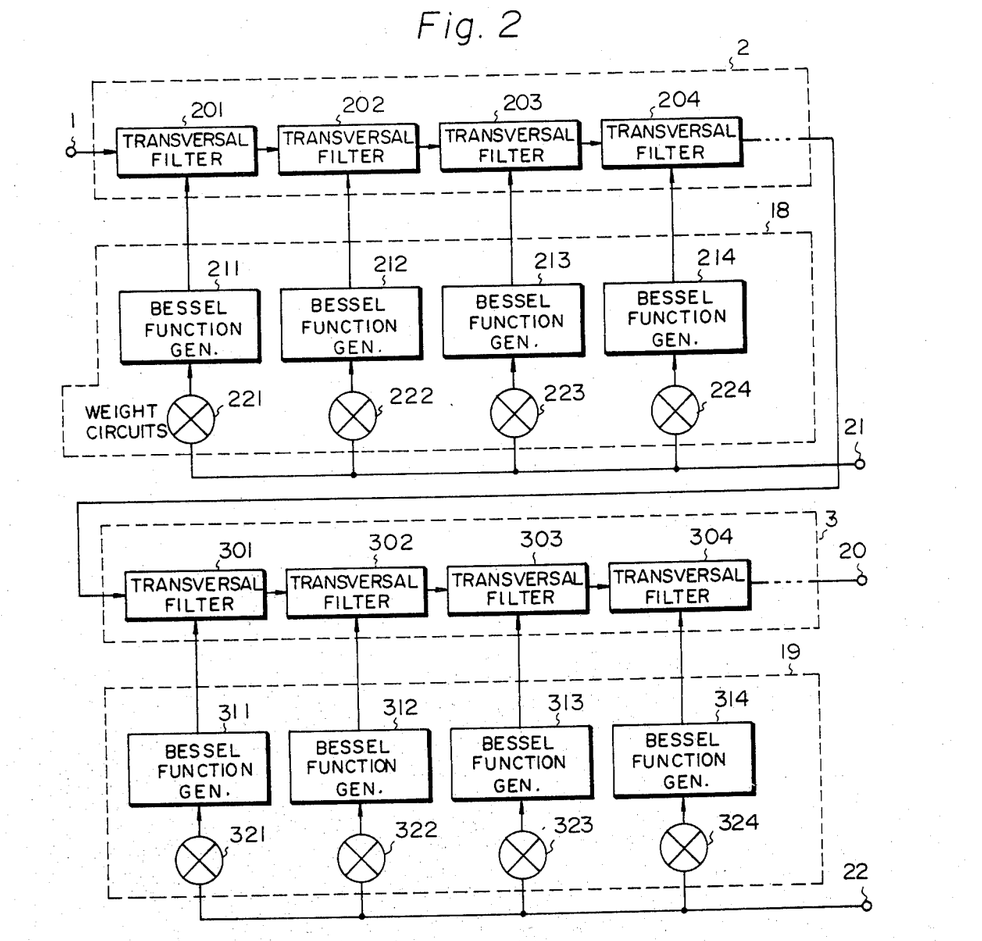
FIG. 2 is a block diagram showing, by way of example, the constructions of a variable phase equalizer and an equalizer control circuit for use in the embodiment of FIG. 1.

FIG. 2 illustrates the internal arrangement corresponding to the broken line block in FIG. 1. Reference numerals 201, 202, 203, . . . indicate transversal filters respectively corresponding to phase characteristics $-4b_2/\tau^2 \cos \omega\tau$, $b_2/\tau^2 \cos 2\omega\tau$, $-4b_2/9\tau^2 \cos 3\omega\tau$, . . . for achieving the characteristic of the first term of the expression (13); and 301, 302, 303, . . . designate transversal filters respectively corresponding to $$\frac{2b_3(\pi^2 - 6)}{\tau^3} \sin \omega\tau, \quad -\frac{2b_3(4\pi^2 - 6)}{8\tau^3} \sin 2\omega\tau,$$

$$\frac{2b_3(9\pi^2 - 6)}{27\tau^3} \sin 3\omega\tau, \ldots$$

for achieving the characteristic of the second term of the expression (13).

Namely, the received intermediate-frequency signal applied from the input signal terminal 1 passes through these transversal filters, by which it is subjected to the phase shift of the expression (14), that is, equalized by the phase characteristic of the expression (11). Reference numerals 211, 212, 213, . . . 311, 312, 313, . . . identify Bessel function generators; and 221, 222, 223, . . . 321, 322, 323, . . . weight circuits which provide the coefficients $-4/\tau^2$, $1/\tau^2$, $-4/9\tau^2$, . . .

$$\frac{2(\pi^2 - 6)}{\tau^3}, \quad -\frac{2(4\pi^2 - 6)}{8\tau^3}, \quad \frac{2(9\pi^2 - 6)}{27\tau^3}, \ldots; \text{respectively,}$$

and to which are applied $b_2$ and $b_3$ from terminals 21 and 22, respectively.

Since the phase equalizers 2 and 3 are constructed as described above, it is possible to equalize not only any characteristics composed of second and third order characteristics of the phase characteristic but also distortions resulting from higher order characteristics, that is, the third order distortion resulting from an odd-order characteristic of a higher order and the second order distortion resulting from an even-order characteristic of a high order. In a case of requiring more precise equalization, as is apparent from the above description, a pilot signal is four times multiplied in frequency, for a fourth order distortion, to phase detect a fourth harmonic, and by the detected output, a phase equalizer of a fourth order characteristic is controlled; and, as to a fifth order distortion, the pilot signal is five times multiplied in frequency for phase detection of a fifth harmonic, and by the detected output, a phase equalizer of a fifth order characteristic is controlled. Instead of multiplying the frequency of the pilot signal, use can also be made of an arrangement employing a phase synchronizing circuit and a frequency divider.

The Bessel function is a function necessary for providing a sine- or cosine-wave phase characteristic while holding the amplitude characteristic of the phase equalizer flat; but, since the amplitude characteristic and the phase characteristic of the transmission line vary simultaneously, it is not always necessary to retain the amplitude characteristic of the phase equalizer flat. Accordingly, it is a matter of course that even if the amplitude characteristic varies somewhat, it may be approximated by some other functions easily available.

As has been described above in detail, according to this invention, ever-changing phase distortions based on propagation in an FM communication circuit and the device characteristics are faithfully removed automatically at all times to maintain the overall phase characteristic of the FM signal transmission system substantially linear, thereby providing for improved transmission performance, while at the same time permitting simplification of the diversity system to enable economization of the transmission equipment.

The above is a system in which a phase distortion is detected from high harmonic waves of a pilot signal included in a baseband signal and a phase equalizer is automatically controlled by the detected output, thereby maintaining the overall phase characteristic substantially linear to suppress the intermodulation noise resulting from the phase distortion. However, this system has no equalization ability with respect to an amplitude distortion, so that it is impossible to suppress the intermodulation noise which occurs in a case of transmitting a telephone signal of more than several thousand channels or in a case of an AM-PM conversion.

With reference to the accompanying drawings, another embodiment of the present invention to attain the second object of the present invention will hereinafter be described in detail.

Figure 3:
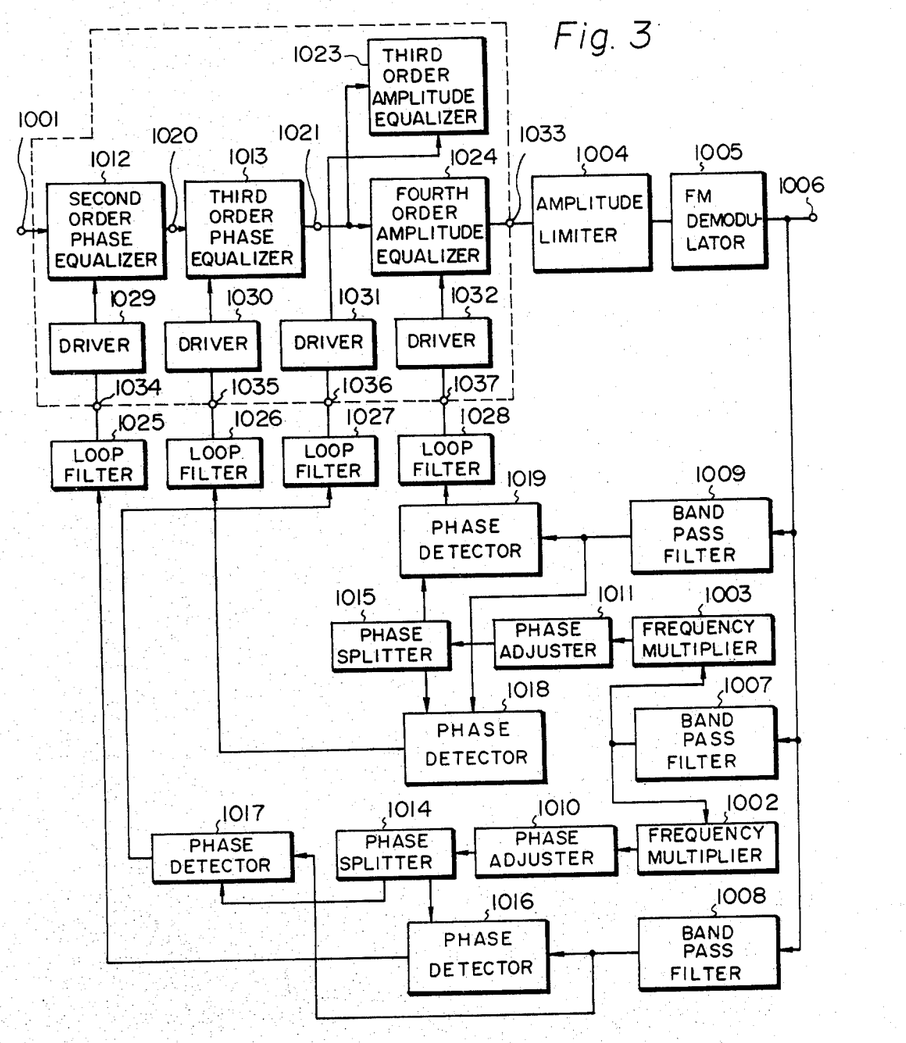
FIG. 3 is a block diagram showing an embodiment of this invention.

At first, the principle of the present embodiment will be described in detail. FIG. 3 is a circuit diagram illustrating an embodiment of this invention. A received FM signal is converted into an intermediate-frequency signal and then applied to an input terminal 1001. This signal is equalized by a second-order phase equalizer 1012, a third-order phase equalizer 1013, a third-order amplitude equalizer 1023 and a fourth-order amplitude equalizer 1024, and is amplitude-limited by an amplitude limiter 1004 and demodulated by an FM demodulator 1005 into a baseband signal, which is obtained at a demodulated output terminal 1006.

The second-order phase equalizer 1012 and the third-order phase equalizer 1013, and the third-order amplitude equalizer 1024 and the fourth-order amplitude equalizer 1024 are to equalize components of the orders respectively corresponding thereto when the amplitude characteristic $A(\omega)$ and the phase characteristic $\phi(\omega)$ of the transmission system are expressed in terms of power series as shown by the following expressions (18) and (19).

$$A(\omega) = a_0 + a_1\omega + a_2\omega^2 + a_3\omega^3 + a_4\omega^4 + \ldots \quad (18)$$

$$\phi(\omega) = b_0 + b_1\omega + b_2\omega^2 + b_3\omega^3 + b_4\omega^4 + \ldots \quad (19)$$

Since the term of the zero order in the expression (18) represents the gain, it is usually possible to set that $a_0 = 1$, and the terms of first and second orders have nothing to do with the transmission distortion, and distortions by the terms of fifth and higher orders are usually negligible. Accordingly, the amplitude characteristic can be regarded as follows:

$$A(\omega) \approx 1 + a_3\omega^3 + a_4\omega^4 \quad (20)$$

As for the expression (19), the terms of zero and first orders have no relation to the transmission distortion, and distortions by the terms of fourth and higher orders are usually negligible, so that the phase characteristic can be regarded as follows:

$$\phi(\omega) \approx b_2\omega^2 + b_3\omega^3 \quad (21)$$

Accordingly, the equalizers are required to equalize the expressions (20) and (21). For convenience of description, examples of the arrangements of the third-order amplitude equalizer 1023, the fourth-order amplitude equalizer 1024, the second-order phase equalizer 1012 and the third-order phase equalizer 1013 will be described later.

In a case where equalization by these equalizers is not complete, a linear distortion occurs and product components of the baseband signal develop to cause an intermodulation noise. Usually, many pilot signals are employed in a carrier telephone circuit, and in a case of even a non-carrier telephone signal being transmitted over a microwave circuit, a pilot signal is often utilized. When a linear distortion occurs in the pilot signal, the harmonics, which are a kind of product components, are produced. Accordingly, these harmonics can be employed for detecting amplitude and phase distortion components.

With respect to a distorted waveform which occurs in the demodulated output when a single sine wave in the modulated signal is subjected to amplitude and phase distortions, various analyses have already been made; for example, "FM Radio Engineering" (edited by T. Sugawara) sets forth that when an FM signal modulated by a signal $\mu(t) = \Delta\omega \cos pt$ is subjected to a linear distortion, distorted components appearing in the demodulated output assume the following waveforms.

That is, distorted waveforms are produced in the following relationships.

| Factor of Generation | Distorted Output Waveform |
|---|---|
| 2nd order of phase characteristic | Gsin2pt |
| 3rd order of phase characteristic | Hsin3pt |
| 3rd order of amplitude characteristic | Icos2pt |
| 4th order of amplitude characteristic | Jcos3pt |

(22)

Values G, H, I and J in the equation (22) are coefficients dependent on values $a_2$ and $a_4$ in the expression (20), values $b_2$ and $b_3$ in the expression (21) and a modulation index. From the expression (22), it is seen that the harmonic orders are equal to the orders of the phase characteristic but lower than the orders of the amplitude characteristic by one order, indicating that the harmonic wave caused by the phase characteristic is orthogonal to the harmonic wave by the amplitude characteristic.

Thus, a control signal for the third-order amplitude equalizer 1023 is obtained by frequency-multiplying the received pilot signal twice to be cos 2pt and by phase-detecting the second harmonic wave using the multiplied signal as a reference signal; and a control signal for the second-order phase equalizer 1014 is obtained by phase shifting the multiplied signal to the sin 2pt and by phase-detecting the second harmonic wave using it as a reference signal. In a similar manner, a control signal for the fourth-order amplitude equalizer 1024 is obtained by frequency-multiplying the received pilot signal to be cos 3pt and by phase-detecting the third harmonic wave using it as a reference signal; and a control signal for the third-order phase equalizer 1013 is obtained by phase shifting the multiplied signal to be sin 3pt and by phase-detecting the third harmonic wave using it as a reference signal.

In FIG. 3, a pilot signal is extracted by a band-pass filter 1007 from the demodulated output signal, frequency-multiplied twice by a frequency multiplier 1002, phase-adjusted by a phase shifter 1010 for correcting a phase deviation of the circuit system and then applied to a $\pi/2$ phase splitter 1014, obtaining the reference signals cos 2pt and sin 2pt. By phase-detecting the output signal from a second harmonic wave extracting band-pass filter 1008 in phase detectors 1016 and 1017 using the abovesaid reference signals, the control signals for the second-order phase equalizer 1012 and the third-order amplitude equalizer 1013 are derived at the outputs of the phase detectors 1016 and 1017, respectively. As a consequence, the second-order phase equalizer 1012 and the third-order amplitude equalizer 1023 can be controlled by these signals through loop filters 1025 and 1027 and equalizer drive circuits 1029 and 1031, respectively.

Further, the reference signals cos 3pt and sin 3pt can be obtained by frequency-multiplying the output from the bandpass filter 1007, by phase adjusting the multiplied output in a phase shifter or adjuster 1011 for correcting a phase deviation of the circuit system and then by applying the phased-adjusted output to a $\pi/2$ phase distributor 1015. By phase-detecting the output signal from a third harmonic wave extracting band-pass filter 1009 in phase detectors 1018 and 1019 using the abovesaid reference signals, there are provided at the outputs of the phase detectors 1018 and 1019 the control signals for the third-order phase equalizer 1013 and the fourth-order amplitude equalizer 1024, respectively. Consequently, the third-order phase equalizer 1013 and the fourth-order amplitude equalizer 1024 can be controlled by these control signals through loop filters 1026 and 1028 and equalizer drive circuits 1030 and 1032, respectively.

As the second-order phase equalizer 1013 1012, the third-order phase equalizer 1013, the third-order amplitude equalizer 1023 and the fourth-order amplitude equalizer 1024 and the drive circuits 1029, 1030, 1031 and 1032, the equalizers and the drive circuits therefor employed in "Automatic Amplitude and Phase Equalization System" (Japan Pat. Appln. Ser. No. 83524/78) filed previously can be utilized as they are. These circuits will hereunder be outlined. Letting required equalizer characteristics be represented by $$A'(\omega) = 1 + C_3\omega^3 + C_4\omega^4 \quad (23)$$

$$\phi'(\omega) = d_2\omega^2 + d_3\omega^3 \quad (24)$$

they can be modified as follows:

$$A'(\omega) = 1 + \frac{C_3}{\tau^3}(\omega\tau)^3 + \frac{C_4}{\tau^4}(\omega\tau)^4 \quad (25)$$

$$= 1 + e_3(\omega\tau)^3 + e_4(\omega\tau)^4$$

$$\phi'(\omega) = 1 + \frac{d_2}{\tau^2}(\omega\tau)^3 + \frac{d_3}{\tau^3}(\omega\tau)^3 \quad (26)$$

$$= f_2(\omega\tau)^2 + f_3(\omega\tau)^3$$

where $e_3 = C_3/\tau^3$, $e_4 = C_4/\tau^4$, $f_2 = d_2/\tau^2$, $f_3 = d_3/\tau^3$ and $\tau$ is a fundamental delay time of a delay element of a transversal filter forming each equalizer. Expanding the expressions (25) and (26) in the Fourier series, they become as follows:

$$A'(\omega) = 1 + e_3\left\{ 2\sum_{n=1}^{\infty}(-1)^{n-1}\frac{n^2\pi^2 - 6}{n^3}\right\} \sin n\omega\tau + \quad (27)$$

$$e_4\left\{ \frac{\pi^4}{5} + 8\sum_{n=1}^{\infty}(-1)^n\frac{n^2\pi^2 - 6}{n^4}\cos n\omega\tau \right\}$$

$$\phi'(\omega) = f_2\left\{ \frac{\pi^2}{3} + 4\sum_{n=1}^{\infty}(-1)^n\frac{1}{n^2}\cos n\omega\tau \right\} + \quad (28)$$

$$f_3\left\{ 2\sum_{n=1}^{\infty}(-1)^{n-1}\frac{n^2\pi^2 - 6}{n^3}\right\} \sin n\omega\tau$$

The third term $\pi^4/5$ in the expression (27) and the first term $\pi^2/3$ in the expression (28) are steady terms and hence can be eliminated, and transfer functions of the equalizers having such characteristics can be obtained by achieving the following expressions:

$$H_{A'}(\omega) = 1 + \sum_{n=1}^{\infty}(a_n \sin n\omega\tau + b_n \cos n\omega\tau) \quad (29)$$

$$H_{\phi A'}(\omega) = e^{j\sum_{n=1}^{\infty}\cos n\omega\tau + d_n\sin n\omega\tau)}$$

where $a_n = e_3 2(-1)^n \frac{n^2\pi^2 - 6}{n^3}$, $b_n = e_4 8(-1)^n \frac{n^2\pi^2 - 6}{n^4}$, $(30)$ $$C_n = f_3 4(-1)^n \frac{1}{n^2} \text{ and } d_n = f_2 2(-1)^{n-1}\frac{n^2\pi^2 - 6}{n^3}.$$

Since the expression (29) can be modified as follows:

$$H_{A'}(\omega) = 1 + \sum_{n=1}^{\infty}\left( -j\frac{a_n}{2}(e^{jn\omega\tau} - e^{-jn\omega\tau}) + \frac{b_n}{2}(e^{jn\omega\tau} + e^{-jn\omega\tau}) \right) \quad (31)$$

the circuit arrangement of the amplitude equalizer can be determined directly from the above. Namely, the exponential function of the expression (31) indicates a delay time and the coefficient represents its weight, so that the above expression shows that the amplitude equalizer can be obtained with such an arrangement is depicted in FIG. 4.

Figure 4:
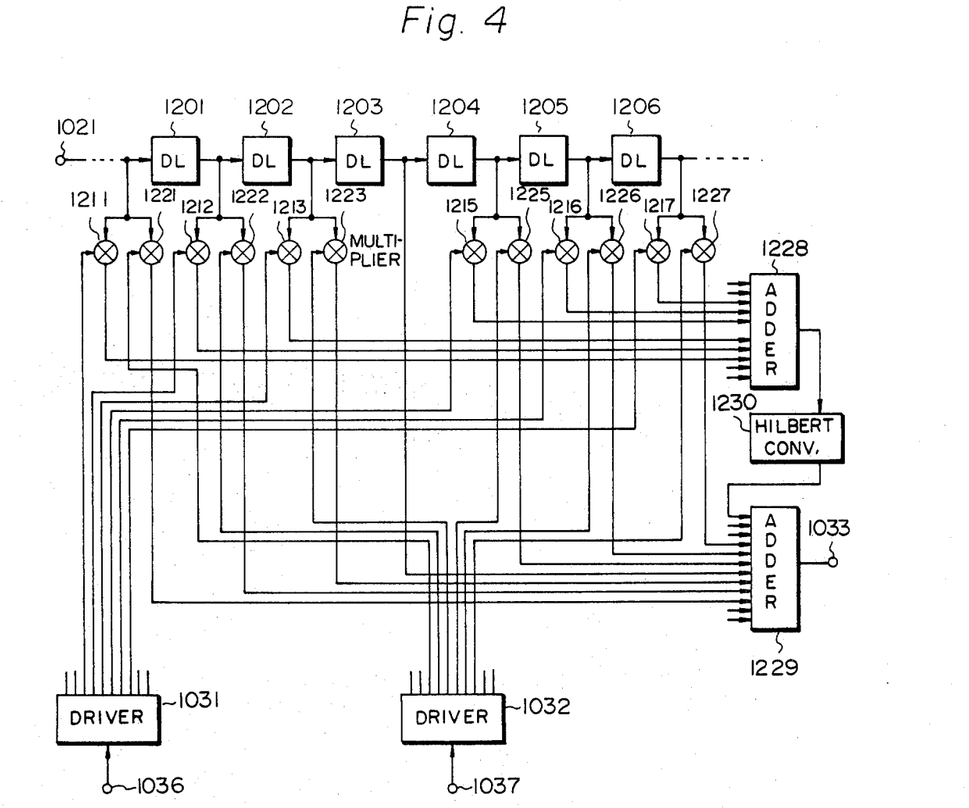
FIG. 4 is a diagram showing an example of the construction of an amplitude equalizer for use in this invention.

In FIG. 4, the same reference numerals as those in FIG. 3 indicate the same circuit elements and terminals as those in FIG. 3. Reference numerals 1201, 1202, 1203, 1204, 1205 and 1206 indicate delay elements, each having a delay time $\tau$. Respective tap (input/output point of each delay element) outputs are multiplied by tap weights in multipliers 1211, 1212, 1213, 1215, 1216, 1217, 1221, 1222, 1223, 1225, 1226 and 1227 and are added together by adders 1228 and 1229 to provide an output at a terminal 1033. The adder 1228 is to achieve the second term of the expression (31), that is, to obtain the third-order amplitude characteristic. Reference numeral 1230 designates a Hilbert converter. The adder 1229 is to combine the center tap output with the third-order amplitude characteristic combined with the fourth-order amplitude characteristic of the third term of the expression (31). Reference numerals 1031 and 1032 identify equalizer drive circuits for producing from the control signals the coefficients $a_n$ and $b_n$ referred to previously following the expression (30).

Next, the construction of the phase equalizer will be described. The expression (30) indicates a phase equalizer having transfer functions $$e^{j\sum_{n=1}^{\infty} C_n \cos n\omega\tau} \text{ and } e^{j\sum_{n=1}^{\infty} d_n \sin n\omega\tau},$$

that is, a cascade connection of second- and third-order phase equalizers, and that it is a cascade connection of phase equalizers having respective period components. The general terms of the transfer functions having the cosine and sine phases can be modified respectively as follows:

$$e^{jC_n \cos n\omega\tau} = J_0(C_n) + \sum_{m=1}^{\infty}(-1)^m J_{2m}(C_n)e^{-j2mn\omega\tau} \quad (32)$$

$$+ \sum_{m=1}^{\infty}(-1)^m J_{2m}(C_n)e^{j2mn\omega\tau}$$

$$+ j\sum_{m=0}^{\infty}(-1)^m J_{2m+1}(C_n)e^{-j(2m+1)n\omega\tau}$$

$$+ j\sum_{m=0}^{\infty}(-1)^m J_{2m+1}(C_n)e^{j(2m+1)n\omega\tau}$$

$$e^{jd_n \sin n\omega\tau} = J_0(d_n) + \sum_{m=1}^{\infty} J_{2m}(d_n)e^{-j2mn\omega\tau} \quad (33)$$

$$+ \sum_{m=1}^{\infty} J_{2m}(d_n)e^{j2mn\omega\tau}$$

$$+ \sum_{m=0}^{\infty} J_{2m+1}(d_n)e^{-j(2m+1)n\omega\tau}$$

$$+ \sum_{m=0}^{\infty} J_{2m+1}(d_n)e^{j(2m+1)n\omega\tau}$$

where $J_0(C_n)$, $J_{2m+1}(d_n)$, ... are Bessel functions.

The circuit constructions of the phase equalizers can be determined directly from the expressions (30), (31) and (32). That is, the second- and third-order phase equalizers 1012 and 1013 in FIG. 3 are constructed according to the expression (30), as shown in FIG. 5.

Figure 5:
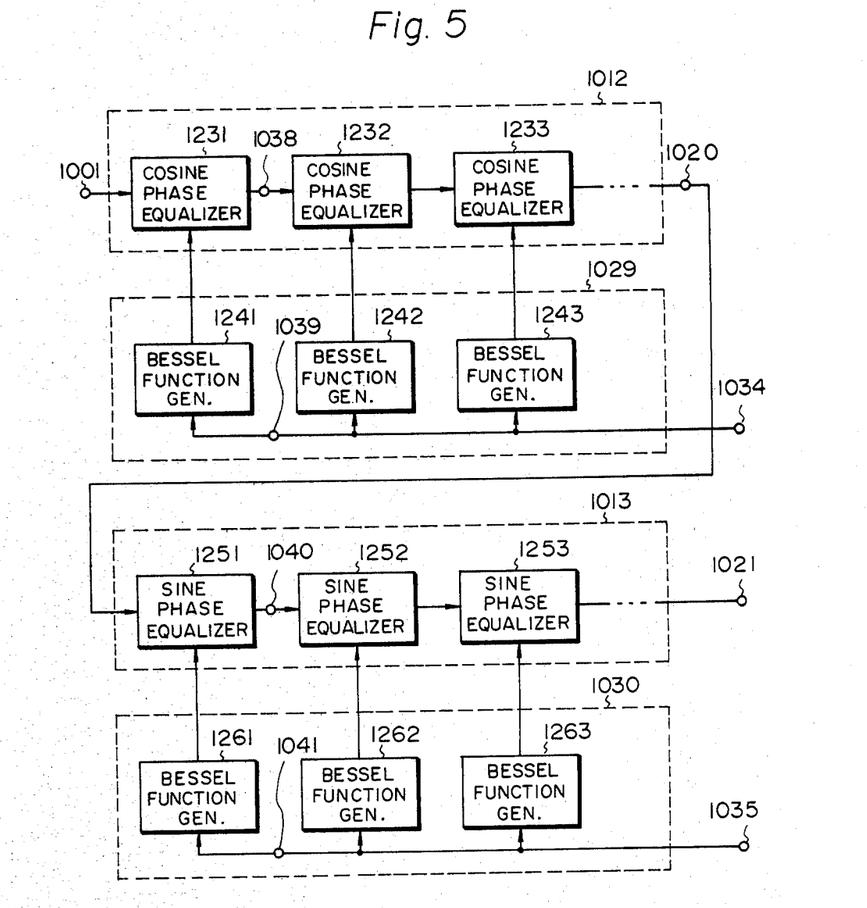
FIG. 5 is a block diagram of a phase equalizer for use in this invention.

In FIG. 5, parts indicated by the same reference numerals as those in FIG. 3 are the same as those in FIG. 3. The second-order phase equalizer 1012 is formed by cosine phase equalizers, and in order to provide the transfer function $$e^{j \sum_{n=1}^{\infty} C_n \cos n\omega\tau}$$

the cosine phase equalizers 1231, 1232, 1233 ... are respectively formed to have transfer functions $e^{jC_1 \cos \omega\tau}$, $e^{jC_2 \cos 2\omega\tau}$, $e^{jC_3 \cos 3\omega\tau}$, .... The third-order phase equalizer 1013 is comprised of sine phase equalizers, and in order to provide the transfer function $$e^{j \sum_{n=1}^{\infty} d_n \sin n\omega\tau}$$

the sine phase equalizers 1251, 1252, 1253, ... are respectively formed to have transfer functions $e^{jd_1 \sin \omega\tau}$, $e^{jd_2 \sin 2\omega\tau}$, $e^{jd_3 \sin 3\omega\tau}$ .... Reference numerals 1241, 1242, 1243, ... and 1261, 1262, 1263, ... represent Bessel function generators forming the equalizer drive circuits 1029 and 1030, respectively.

The cosine phase equalizers 1231, 1232, 1233, ... are of the same circuit construction and differ only in the tap weight, as is evident from the expression (32). The sine phase equalizers 1251, 1252, 1253, ... are also of the same circuit construction and differ only in the tap weight, as is apparent from the equation (33). The arrangements of the cosine phase equalizer 1231 and the Bessel function generator 1241, and the sine phase equalizer respectively shown in FIGS. 6A and 6B, by way of example.

Figure 6A:
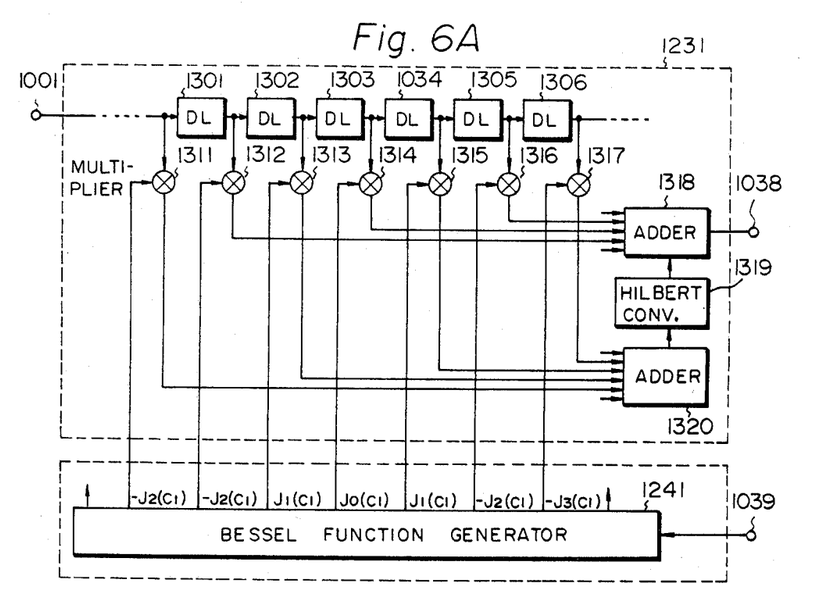
FIGS. 6A and 6B are diagrams illustrating examples of a cosine phase equalizer and a sine phase equalizer which form a part of the phase equalizer.

In FIG. 6A, the outputs from the taps serving as input/output points of delay elements 1301, 1302, ... 1306, each having a delay time $\tau$, are weighted by multipliers 1311, 1312, ... 1317 using the output from the Bessel function generator 1241; the outputs from odd-numbered tap counted from the center tap are combined by an adder 1320 and applied via a Hilbert converter 1319 to an adder 1318 for combination with other components. With this circuit, an operation in a case of n=1 in the expression (32) can be executed.

Figure 6B:
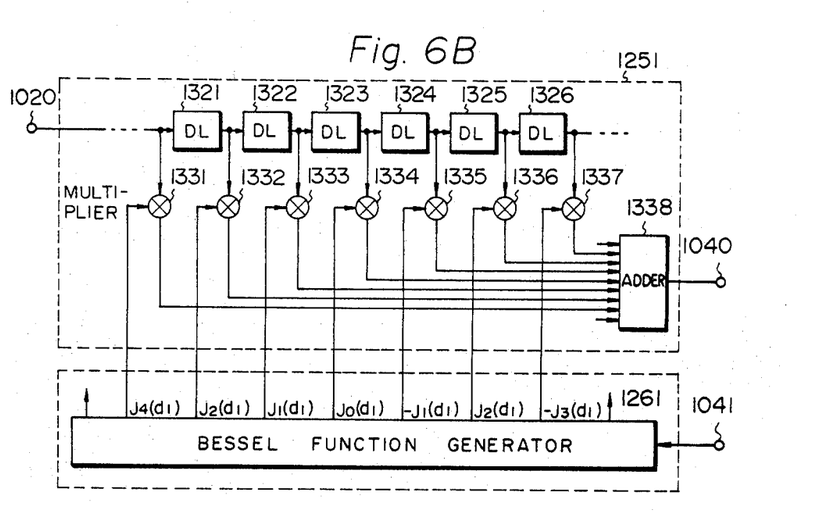
Figure 7:
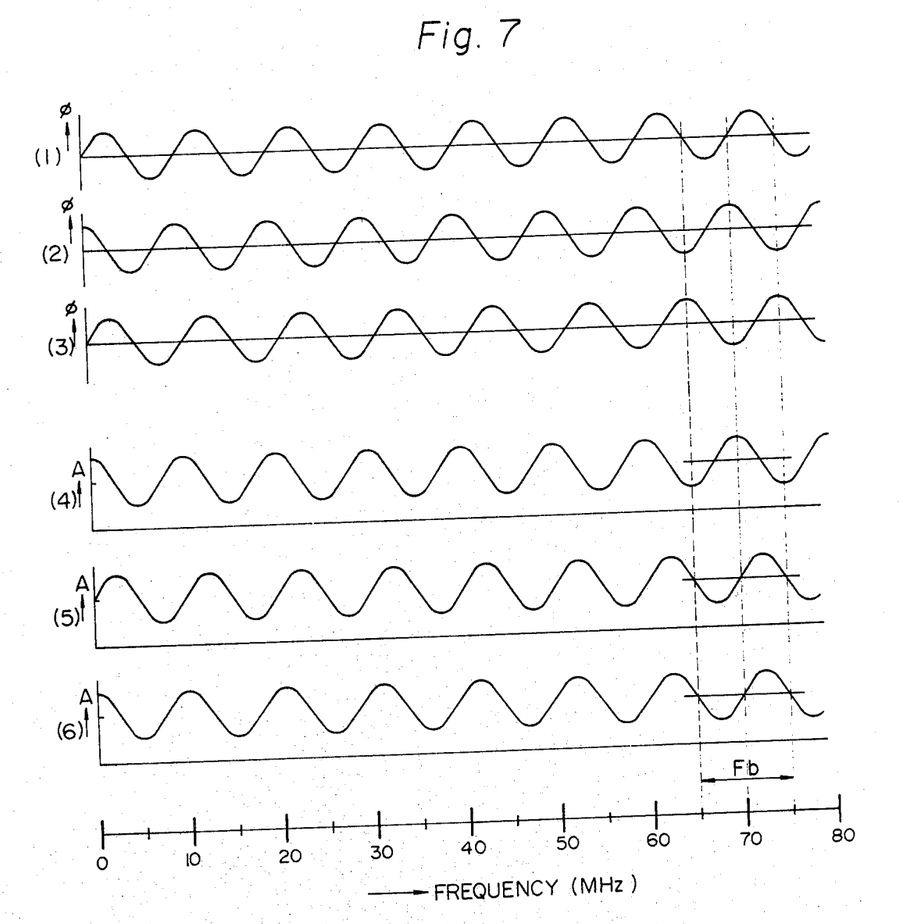
FIG. 7 shows a series of amplitude characteristics of the amplitude equalizer and phase characteristics of the phase equalizer in a case of the delay time of a delay element being varied.

In FIG. 6B, the outputs from the taps serving as input/output points of delay elements 1321, 1322, ... 1326, each having a delay time $\tau$, are weighted by multipliers 1331, 1332, ... 1337 using the output from the Bessel function generator 1261, and these signals are combined by an adder 1338. With this circuit, an operation in a case of n=1 in the expression (33) can be executed.

The greatest difference in the content between the expressions (32) and (33) is the inclusion of the Hilbert converter in the expression (32); but, in a case where the frequency handled is the band-pass type as in the present embodiment, the expressions (32) and (33) both repeat with a period of $\omega\tau=2\pi$, so that it is sufficient that the phase characteristic assume cosine and sine forms with respect to the center frequency of the band, and consequently, by a suitable selection of $\tau$, the Hilbert converter can also be eliminated. For example, in a case where the center frequency of the intermediate frequency is 70 MHz and the band width is 10 MHz ($\pm 5$ MHz), if $\tau$ is selected to be 100 ns, it is possible with the circuit of FIG. 6B to obtain the sine phase characteristic with respect to 70 MHz, as shown in FIG. 7(1). In the circuit of FIG. 6A, if $\tau=100$ ns, the cosine phase characteristic is provided with respect to 70 MHz, as depicted in FIG. 7(2); but, in the circuit of FIG. 6B if $\tau=(13.5/70\times 2)$ ms $\approx 96.43$ ns, the phase characteristic is a sine one with respect to the origin but a substantially cosine one with respect to 70 MHz, as shown in FIG. 7(3). As a consequence, no Hilbert converter is needed.

Figure 8:
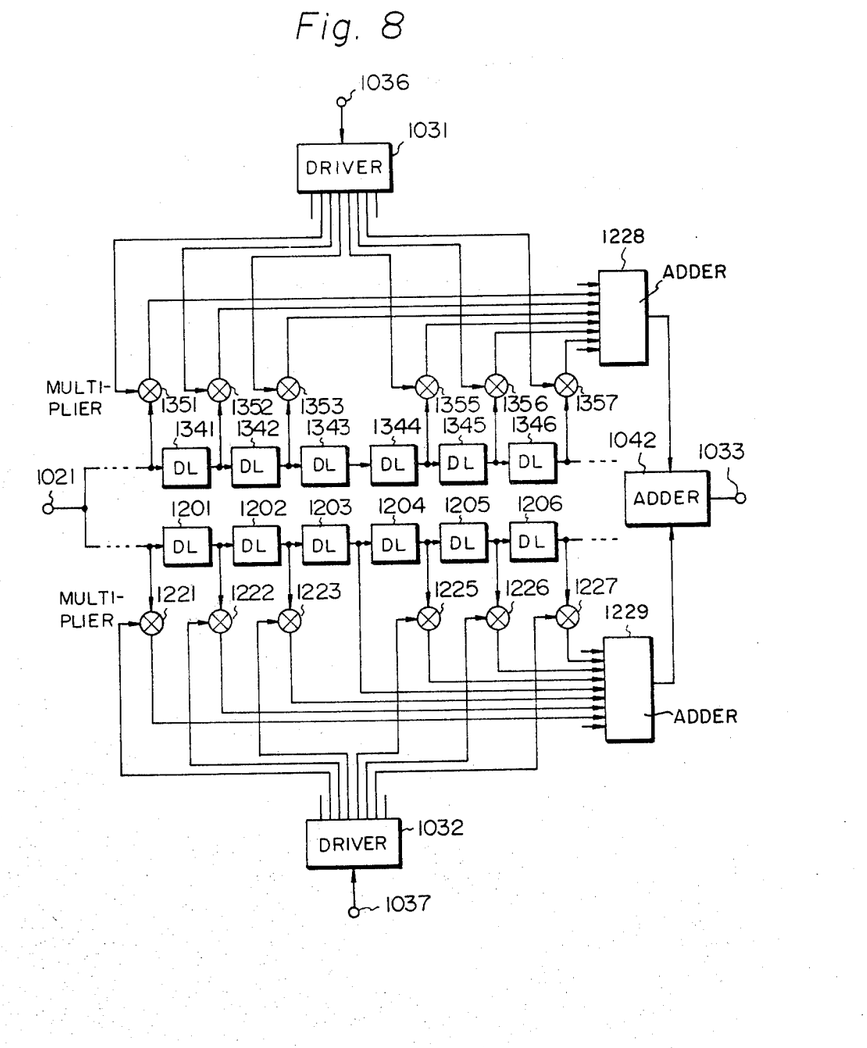
FIG. 8 is a diagram illustrating an example of the construction of the amplitude equalizer without a Hilbert converter being used.

Also in the amplitude equalizer, the Hilbert converter is used to obtain the sine amplitude characteristic as is the case with the phase equalizer. That is, if the Hilbert converter is not used with $\tau=100$ ns, the cosine amplitude characteristic of FIG. 7(4) is obtained as an ordinary positive paired tap system, and this is also a cosine characteristic with respect to 70 MHz. By the use of the Hilbert Converter, such a sine amplitude characteristic as shown in FIG. 7(5) is obtained, but, also in this case, if $\tau \approx 96.43$ ns, the amplitude characteristic is a cosine characteristic with respect to the origin, as shown in FIG. 7(6), but it becomes a sine amplitude characteristic with respect to 70 MHz, resulting the Hilbert converter becoming unnecessary. But instead, delay element of different delay times $\tau$ are required, as shown in FIG. 8. In FIG. 8, reference numerals 1341, 1342, ... 1346 indicate such delay elements; 1351, 1352, ... 1357 designate multipliers; and 1042 identifies an adder. The parts identified by the same reference numerals as those in FIG. 4 are the same parts as in FIG. 4.

As has been described above in detail, according to this invention, a transmission distortion by fading in an FM radio circuit can be removed by automatically equalizing variations in the amplitude and the phase characteristic in the transmission band. Accordingly, the intermodulation noise is suppressed to provide for improved transmission performance, so that the system can be made used for alleviating selective fading with no use of a large antena or the complicated diversity system. At the same time, since the transmission characteristic is improved, the coherent bandwidth is expanded while the number of transmission channels can be increased.

The present embodiment has been described in connection with the amplitude characteristic up to the fourth order and the phase characteristic up to the third order, but it is easy from the foregoing description to increase the equalization degree in accordance with the amount of intermodulation noise or the coherent band width.

What we claim is:

1. An automatic phase equalization system in an FM communication circuit comprising:
   input terminal means for receiving a transmitted FM signal;
   variable phase equalizer means connected to said input terminal means to develop an equalized output from said transmitted FM signal;
   FM demodulator means connected to said variable phase equalizer means to provide an demodulated baseband output from said equalized output;
   first filter means connected to said FM demodulator means for obtaining at least one harmonic wave of a pilot signal included in said demodulated baseband output;

second filter means connected to said FM demodulator means for obtaining said pilot signal;

frequency multiplying means connected to said second filter means to obtain at least one reference wave by frequency-multiplying said pilot signal from said second filter means;

phase detector means connected to said first filter means and said frequency multiplying means to phase-detect said harmonic wave by the use of said reference wave as a reference so as to develop at least one detected output;

control means connected to said phase detector means and said variable phase equalizer means for controlling said variable phase equalizer means by the detected output to reduce the level of said harmonic wave; and output terminal means connected to said FM demodulator means for obtaining the demodulated baseband signal.

2. An automatic phase and amplitude equalization system in an FM communication circuit comprising:

input terminal means for receiving a transmitted FM signal;

equalizer means connected to said input terminal means and comprising a cascade connection of variable phase equalizer means and variable amplitude equalizer means to develop an equalized output from said transmitted FM signal;

FM demodulator means connected to said equalizer means to provide an demodulated baseband output from said equalized output;

first filter means connected to said FM demodulator means for obtaining at least one harmonic wave of a pilot signal included in said demodulated baseband output;

second filter means connected to said FM demodulator means for obtaining said pilot signal;

frequency multiplying means connected to said second filter means to obtaining at least one first reference wave and at lease one second reference wave by frequency-multiplying said pilot signal from said second filter, said second reference wave having a phase difference of 90° with respect to said first reference wave;

first phase detector means connected to said first filter means and said frequency multiplying means to phase-detect said harmonic wave by the use of said first reference wave as a reference so as to develop at least one first detected output;

second phase detector means connected to said first filter means and said frequency multiplying means to phase-detect said harmonic wave by the use of said second reference wave as a reference so as to develop at least one second detected output;

first control means connected to said equalizer means and said first phase detector means for controlling said variable phase equalizer means by the first detected output to reduce the level of said harmonic wave;

second control means connected to said equalizer means and said second phase detector means for controlling said variable amplitude equalizer means by the second detected output to reduce the level of said harmonic wave; and output terminal means connected to said FM demodulator means for obtaining the demodulated baseband signal.

* * * * *